US008693678B2

(12) United States Patent
Lindström et al.

(10) Patent No.: US 8,693,678 B2
(45) Date of Patent: Apr. 8, 2014

(54) DEVICE AND METHOD FOR CONTROLLING DAMPING OF RESIDUAL ECHO

(75) Inventors: Fredric Lindström, Umeå (SE); Christian Schüldt, Stockholm (SE); Ingvar Claesson, Dalby (SE)

(73) Assignee: Limes Audio AB (SE)

( * ) Notice: Subject to any disclaimer, the term of this patent is extended or adjusted under 35 U.S.C. 154(b) by 175 days.

(21) Appl. No.: 13/384,554

(22) PCT Filed: Jun. 17, 2010

(86) PCT No.: PCT/SE2010/050676
§ 371 (c)(1),
(2), (4) Date: Mar. 28, 2012

(87) PCT Pub. No.: WO2011/010960
PCT Pub. Date: Jan. 27, 2011

(65) Prior Publication Data
US 2012/0183133 A1    Jul. 19, 2012

(30) Foreign Application Priority Data

Jul. 20, 2009 (SE) ...................................... 0901012

(51) Int. Cl.
*H04M 9/08* (2006.01)
(52) U.S. Cl.
USPC ................................ 379/406.08; 379/406.02
(58) Field of Classification Search
USPC ........................................ 379/406.01–406.16
See application file for complete search history.

(56) References Cited

U.S. PATENT DOCUMENTS

| 5,663,955 | A | * | 9/1997 | Iyengar | .......................... 370/291 |
| 6,163,609 | A | * | 12/2000 | Makinen et al. | ......... 379/406.08 |
| 6,532,289 | B1 | | 3/2003 | Magid | |
| 2003/0021389 | A1 | * | 1/2003 | Hirai et al. | ........................ 379/3 |

(Continued)

FOREIGN PATENT DOCUMENTS

| WO | WO-02/23755 A2 | 3/2002 |
| WO | WO-2005/002184 A2 | 1/2005 |
| WO | WO-2006/040734 A1 | 4/2006 |

OTHER PUBLICATIONS

"International Application Serial No. PCT/SE2010/050676, International Preliminary Report on Patentability dated Jan. 24, 2012", 6 pgs.

(Continued)

*Primary Examiner* — Simon Sing
(74) *Attorney, Agent, or Firm* — Schwegman Lundberg & Woessner, P.A.

(57) ABSTRACT

The present invention relates to a device, such as a communication device, comprising an adaptive foreground filter configured to calculate a first echo estimation signal based on a first input signal, and an adaptive background filter being more rapidly adapting than the foreground filter and configured to calculate a second echo estimation signal based on said first input signal. Embodiments of the device further comprise damping control means for controlling damping of an echo-cancelled output signal. The device in various embodiments includes that the damping control means is configured to calculate a maximum echo estimation signal using both the first and the second echo estimation signals, and control the damping of the echo-cancelled output signal based on said maximum echo estimation signal and/or a signal derived from said maximum echo estimation signal.

17 Claims, 5 Drawing Sheets

(56) References Cited

U.S. PATENT DOCUMENTS

2003/0206624 A1 11/2003 Domer et al.
2007/0274535 A1 11/2007 Mao
2008/0205633 A1* 8/2008 Dyba et al. ............... 379/406.08

OTHER PUBLICATIONS

"International Application Serial No. PCT/SE2010/050676, International Search Report mailed Nov. 23, 2010", 4 pgs.
"International Application Serial No. PCT/SE2010/050676, Written Opinion mailed Nov. 23, 2010", 5 pgs.
Hänsler, E., et al., "Chapter 14—Control of Noise and Echo Suppression Systems", *In: Acoustic Echo and Noise Control: A Practical Approach,* Wiley, (2004), 349-359.
Mader, A., et al., "Step-size control for acoustic echo cancellation filters—an overview", *Signal Processing,* 80(9), (Sep. 2000), 1697-1719.
Ochiai, K., et al., "Echo Canceler with Two Echo Path Models", *IEEE Transactions on Communications,* 25(6), (Jun. 1977), 589-595.
Schuldt, C., et al., "A Combined Implementation of Echo Suppression, Noise Reduction and Comfort Noise in a Speaker Phone Application", *International Conference on Consumer Electronics, 2007. ICCE 2007. Digest of Technical Papers,* (2007), 1-2.

* cited by examiner

DEVICE AND METHOD FOR CONTROLLING DAMPING OF RESIDUAL ECHO

RELATED APPLICATIONS

This application is a nationalization under 35 U.S.C. 371 of PCT/SE 2010/050676, filed Jun. 17, 2010 and published as WO 2011/010960 A1 on Jan. 27, 2011, which claims priority to Sweden Patent Application No. 0901012-5, filed Jul. 20, 2009; which applications and publication are incorporated herein by reference in their entirety.

TECHNICAL FIELD

The present invention relates to a device according to the preamble of claim 1, a method for controlling damping of an echo-cancelled output signal according to the preamble of claim 8, a computer program according to the preamble of claim 13, and a computer program product according to the preamble of claim 14.

BACKGROUND OF THE INVENTION

The invention concerns a technological solution targeted for communication systems where there is a feedback between outgoing and incoming signals, such as e.g. in a conference telephone where the outgoing loudspeaker signal is picked up by the microphone. This invention is intended to reduce the negative effects of such feedback.

This type of unwanted feedback may occur in different types of communication devices, particularly in hands-free full-duplex communication devices in which the microphone is or may be positioned such that signals output by the loudspeaker are easily picked up by the microphone. Examples of such communication devices are hands-free conference telephones, hands-free car telephone systems, installed room systems using ceiling speakers and table microphones, conventional telephones or mobile telephones in speakerphone or hands-free mode, etc.

When describing, e.g., a hands-free conference telephone during an active conference call, the A-side (near-end side) commonly denotes the physical room in which the conference telephone is placed, and the B-side (far-end side) commonly denotes the physical location of the other participating part of the conference call. The A-talker is located at the A-side and the speech of the A-talker is picked up by the microphone of the conference telephone, processed and then sent through the telephone network to the B-side and the B-talker. The speech of the B-talker is sent over the telephone network and received by the conference telephone, which processes the received B-talk speech and presents it on the loudspeaker on the A-side.

In a scenario like the one described above, two types of echoes are present. First, in addition to the B-talker signal, the conference telephone may receive a delayed line echo of the A-talker speech possibly due to echoes generated in the telephone network. Then, due to room acoustics, there will be an acoustic echo present on the microphone when the speech of the B-talker is present on the loudspeaker. To remove the echoes is of outmost importance due to both listening comfort and system stability (to prevent so-called howling).

The echoes are typically removed through damping, cancellation or a combination of both damping and cancellation. The damping solution is relatively simple, but will in situations where both A-talker and B-talker are speaking simultaneously only let one speaker through. This is called a half-duplex solution. Echo cancellation, on the other hand, typically uses one or more adaptive filters to model the echo, which is then subtracted from the microphone signal without disturbing the desired speech. This allows speech from both the A-talker and the B-talker simultaneously, denoted full-duplex. In practice however, echo cancellation will not completely remove the echo. Thus, a combination of echo cancellation and damping (to remove the non-cancelled residual echo) is frequently used.

How much the residual echo should be damped depends on the situation, but generally is a function of the speech-to-echo-ratio. A signal containing strong speech combined with weak echo should not be damped as much as a signal with weak speech combined with strong echo, since the speech will in a sense mask the echo. Moreover, to be able to achieve high listener comfort, the speech should be as unaffected by the damping as possible. Determining the speech-to-echo-ratio in a signal is a non-trivial problem.

The problem can also be formulated as differentiating between double-talk and an echo path change. A double-talk situation occurs when both A-side and B-side speakers are active simultaneously. In the double-talk situation, the signal after echo cancellation will be a combination of residual echo and speech, i.e. the signal will contain more energy than a signal with pure residual echo. In an echo-path change situation, the feedback properties will change. This can occur due to changes in the acoustic environment (e.g. people or objects are moving on the A-side) or changes in the telephone network (e.g. a call is being set up). The adaptive echo cancelling filter will then produce a larger residual echo until it has had time to adapt to the change. Hence, in both the double-talk and the echo-path change case the output energy from the echo canceller will increase. In the double-talk situation the damping should be restricted, whereas significant damping should be applied in the echo-path change situation. One problem is thus how to distinguish a double-talk situation from an echo-path change situation. Another problem is that adaptive echo cancelling filters sometimes act unpredictably in, and immediately after, double-talk situations. This makes it difficult to assess the correct amount of echo, potentially leading to underestimation of the echo present in these situations. The risk of underestimating the amount of echo present calls for a safety margin when calculating the speech-to-echo ratio in order to minimize the risk of detecting the echo as near-end speech. A drawback of the safety margin is of course that it complicates the detection of true near-end speech.

Significant for distinguishing double-talk from echo-path change, and also for other applications, is the ability to estimate the stationary noise level and the coupling (feedback) factor (i.e. the strength of the echo). A common method to achieve noise estimation is based on minimum statistics, as described in e.g. "Acoustic Echo and Noise Control: A Practical Approach" by E. Hänsler and G. Schmidt, Wiley, 2004, and in "A Combined Implementation of Echo Suppression, Noise Reduction and Comfort Noise in a Speaker Phone Application" by C. Schüldt, F. Lindstrom and I. Claesson, In Proceedings of IEEE International Conference on Consumer Electronics, Las Vegas, Nev., Jan. 2007. Estimation of the coupling factor can be achieved through e.g. the ratio of the estimated loudspeaker and microphone power, or be extracted from the near-end part of the adaptive filter coefficients. More details of how to estimate the coupling factor can be found in e.g. "Step-size control for acoustic echo cancellation filters—an overview" by A. Mader, H. Puder, G. U. Schmidt, Signal Processing, vol. 80, no. 9, pp. 1697-1719, 2000.

The differentiation between double-talk and echo path change is also crucial for avoiding divergence of adaptive echo cancelling filters, which can occur during double-talk. Thus, the filter adaption should be halted during double-talk. If a single adaptive filter is used and an echo-path change is mistaken for a double-talk situation, the adaptive filter will not update, leading to a dead-lock situation. A structure for avoiding the dead-lock problem is the so called two-path algorithm, where two adaptive echo cancelling filters are used in parallel. This structure is described in more detail in "Echo canceller with two echo path models" by K. Ochiai, T. Araseki, and T. Ogihara, IEEE Transactions on Communications, vol. COM-25, no. 6, pp. 8-11, June 1977. One filter, often referred to as the background filter, is continuously (i.e. very frequently) adapted whereas the other filter, often referred to as the foreground filter, is adapted much less frequently. For this reason, the foreground filter is sometimes referred to as a "fixed" filter. The foreground filter, or the "fixed" filter, is the filter producing the output used for echo cancellation and adaption of the foreground filter is performed by copying the frequently adapting background filter into the foreground filter when the background filter is considered to perform better in terms of echo cancellation. This is what happens in an echo path-change situation. In a double-talk situation on the other hand, the background filter will diverge. However, this will not affect the system output since the fixed foreground filter is providing the output.

The above-discussed conventional solution suffers from drawbacks which, in situations depending on the particular solution, make it difficult to determine which level of damping should be applied to the residual echo in communication devices. There is thus a need for an alternative solution for controlling the damping of residual echo in communication devices.

SUMMARY OF THE INVENTION

It is an object of the present invention to provide means for improved residual echo damping control.

This object is achieved by a device comprising an adaptive foreground filter configured to calculate a first echo estimation signal based on a first input signal, and an adaptive background filter being more rapidly adapting than the foreground filter and configured to calculate a second echo estimation signal based on said first input signal. The device further comprises damping control means for controlling damping of an echo-cancelled output signal. The device is characterised in that the damping control means is configured to calculate a maximum echo estimation signal using both the first and the second echo estimation signals, and control the damping of the echo-cancelled output signal based on said maximum echo estimation signal and/or a signal derived from said maximum echo estimation signal.

The object is also achieved by a method for controlling damping of an echo-cancelled output signal, comprising the steps of:
  calculating, by means of a foreground filter, a first echo estimation signal based on a first input signal, and
  calculating, by means of an adaptive background filter being more rapidly adapting than said foreground filter, a second echo estimation signal based on said first input signal. The method is characterised by the steps of:
  calculating a maximum echo estimation signal using both said first and said second echo estimation signals, and
  controlling the damping of said echo-cancelled output signal based on said maximum echo estimation signal and/or a signal derived from said maximum echo estimation signal.

The object of the invention is also achieved by a computer program for the device described above. The computer program is characterised in that it comprises computer readable code which, when run by a processing unit in the device, causes the device to perform the above-described method.

The above-defined device and method may be used both for controlling damping of residual acoustic echo generated in a communication device, such as a conference telephone, when a microphone of the communication device picks up a loudspeaker signal simultaneously output by a loudspeaker thereof, and for controlling damping of residual line echo generated in a network, e.g. a telephone network, to which communication devices are connected.

In the former scenario, which scenario hereinafter will be referred to as the acoustic echo scenario, the first input signal is the loudspeaker signal received by the communication device and intended to be converted to sound by a loudspeaker thereof. The echo-cancelled output signal is an echo-cancelled microphone signal which is generally formed by subtracting an acoustic echo signal estimated based on the loudspeaker signal from the microphone signal that is picked up by a microphone of the communication device at the time the loudspeaker signal is output by the loudspeaker.

In the latter scenario, which scenario hereinafter will be referred to as the line echo scenario, the first input signal is the line out signal transmitted from a first communication device to a network to which it is connected, normally for further transmission to a second communication device. The echo-cancelled output signal is an echo-cancelled line in signal which is generally formed by subtracting a line echo signal estimated based on said line out signal from a line in signal that is to be transmitted to the first communication device.

In the following, the invention and the advantages thereof will be described mainly in the context of an acoustic echo scenario. However, it should be understood that, unless stated otherwise, the same principles apply mutatis mutandis to the line echo scenario.

By controlling the damping of the echo-cancelled microphone signal based on a signal that is calculated using the echo estimation signals from both the foreground and background filter, several advantages are achieved. Since the background filter is configured to be more rapidly adapting than the foreground filter, meaning that the filter coefficients of the background filter converge more rapidly to new values upon a change in a filter input signal, the echo estimation signal from the foreground filter is more reliable in certain situations, whereas the echo estimation signal from the background filter is more reliable in other situations. Typically, the background filter generates better echo estimates than the foreground filter in echo-path change situations whereas the foreground filter is more reliable than the background filter in double-talk situations. By controlling the damping based on a signal calculated from both of them, the advantages of each filter can be utilized in the damping control.

According to a preferred embodiment of the invention, the maximum echo estimation signal is calculated based on the power or energy spectral densities of the first and second echo estimation signals. This can be achieved by, e.g., rectifying the first and second echo estimation signals and, for a given frequency or frequency range, calculate an amplitude value for the maximum echo estimation signal based on the power or energy of the rectified echo estimation signal having the highest power or energy of the first and second rectified echo estimation signals at said frequency or within said frequency range.

According to one aspect of the invention, the maximum echo estimation signal is calculated to correspond to the echo estimation signal having the highest power spectral density taken over the entire frequency range of the foreground and background filter outputs. This results in a maximum echo estimation signal corresponding to the echo estimation signal having the highest total energy of the first and second echo estimations signals. According to another aspect, the energies of the first and second echo estimation signals, and the maximum echo estimation signal, are calculated on a sub-band basis. For example, the power spectral densities of the first and second echo estimation signal can be calculated on a sub-band-by-sub-band basis, and, for each sub-band, the maximum echo estimation signal of a particular sub-band can be calculated to correspond to the echo estimation signal having the highest power spectral density within that particular sub-band.

The speech-to-echo ratio of the microphone signal can be estimated for the full-band microphone signal based on a single full-band maximum echo estimation signal, or individually estimated for each of a plurality of sub-bands of the microphone signal based on a sub-band maximum echo estimation signal calculated for the corresponding sub-band. Likewise, residual echo damping may be performed by applying a single damping signal to the echo-cancelled microphone signal or by applying a plurality of sub-band damping signals to the echo-cancelled microphone signal, which sub-band damping signals can be calculated from the individually estimated speech-to-echo-ratios for the corresponding sub-bands or from combinations of neighbouring sub-bands. Thereby, damping can be applied individually to each sub-band.

By making the sub-bands narrower, the amplitude of the maximum echo estimation signal for a given frequency can be made to correspond to the maximum amplitude of the first and second rectified echo estimation signals for that particular frequency.

Performing the processing in sub-bands takes advantage of the specific spectral characteristics of speech, e.g. that energy is concentrated to specific sub-bands, and can further improve the structure as compared to the full-band solution.

By calculating a maximum echo estimation signal based on the maximum power or energy carried by the first and second echo estimation signals according to any of the above-described principles, a maximum echo estimation signal representing a "worst case echo scenario" is generated. The maximum echo estimation signal avoids underestimating the true echo signal.

At any given point in time, one of the foreground and background filters may be better adapted than the other for estimating the echo occurring at a certain frequency or within a certain frequency range, while the other filter is better adapted for estimating the echo occurring at another frequency or within another frequency range. By calculating the maximum echo estimation signal on a sub-band by sub-band basis, or even on a frequency-by-frequency basis, the maximum echo estimation signal will represent the worst case echo scenario at every given frequency or frequency range.

In a communication system it is important not to damp a signal carrying speech so as to not deteriorate usability of the system. However, it is normally considered as more acceptable, during a short period of time, to apply damping to a speech-carrying signal than not to apply damping to a signal carrying nothing but echo. Loss of speech or reduction in volume of speech during a time period of some milliseconds is normally considered less annoying by a user than the sound of echo during that same time period, which sound often is perceived by the user as an annoying sound. By calculating the maximum echo estimation signal as proposed above, the risk of not damping a microphone signal which carries nothing but echo is minimized since the damping is controlled based on a worst case echo scenario.

Normally, in an echo-path change situation caused by, e.g., movement of people or objects in the room, the background filter will rapidly adapt to the new acoustic environment and output a good estimation of the echo picked up by the microphone. For example, in an echo-path change situation where the true echo energy is increasing, the adapting background filter will adapt to the new echo path and produce a corresponding increased echo energy estimation, while the fixed foreground filter will continue to produce low echo energy estimate according to the previous echo path. In a double-talk situation on the other hand, the adapting background filter will diverge and cancel the near-end speech, which may result in a too low estimate of the echo energy, while the fixed foreground filter will produce a much more accurate estimate. Using the maximum energy of the echo estimation signals will thus sometimes produce an overestimation of the echo, but never an underestimation. Overestimating the echo will yield to more echo-damping than necessary. However, applying a more significant damping than needed to the echo-cancelled microphone signal is considered acceptable in this case, especially since the increase in damping is caused by an echo-path change situation and not a double-talk situation.

Furthermore, controlling the damping of the echo-cancelled microphone signal based on a signal calculated as the maximum of the first and second echo estimation signal as described above is advantageous in situations in which the rapidly adapting background filter has to be rebooted, which situations occur from time to time. Upon a reboot it will take some time for the filter coefficients of the background filter to reach the "true" values and in the meantime the background filter will generate too low estimates of the echo. However, the maximum echo estimation signal will, in this situation, correspond to the echo estimation signal output by the foreground filter and hence be maintained at an acceptable level.

Preferably, the damping control means is configured to control damping of the echo-cancelled output signal based on the maximum echo estimation signal and a second input signal. In the acoustic echo scenario the second input signal is the microphone signal and, in the line echo scenario, the second input signal is the line in signal. This may be achieved, e.g., by controlling the damping in dependence of a signal obtained by subtracting the energy of the maximum echo estimation signal from the energy of the second input signal, or in dependence of a signal obtained by taking the quotient of the energy of the second input signal and the energy of the maximum echo estimation signal. If the ratio between the energy of the second input signal and the energy of the maximum echo estimation signal is close to one, the second input signal is likely to carry nothing but echo (acoustic echo in the acoustic echo scenario and line echo in the line echo scenario) whereupon the control damping means can apply significant damping to the echo-cancelled output signal. If, on the other hand, the ratio is much larger than one, the second input signal is likely to carry speech whereupon damping of the echo-cancelled output signal is restricted.

According to a refined embodiment of the invention, the damping control means is configured to calculate a minimum residual echo estimation by subtracting the energy of the maximum echo estimation signal from the energy of the second input signal, and to calculate a maximum residual echo estimation based on the first input signal and a coupling factor, and control the damping of the echo-cancelled output signal based on a comparison between the minimum residual echo estimation signal and the maximum residual echo estimation. In the acoustic echo scenario, the coupling factor is normally referred to as the acoustic coupling factor and is a measure of the dependency between the loudspeaker signal and the microphone signal. In the line echo scenario, the coupling factor is a measure of the dependency between the line out signal and the line in signal. If the ratio between the minimum and maximum residual echo estimation signal is high, the probability that the second input signal carries speech is very high. If, however, the ratio is low, the second input signal is likely to carry nothing but echo and the echo-cancelled output signal can be heavily damped.

The calculations described above may be performed on a sub-band basis, meaning that some or all calculations can be performed for one or several sub frequency bands of the processed signals individually. Damping of the echo-cancelled output signal, i.e. the residual damping, can then be controlled based on the result of the calculations performed for one or several sub-bands. Damping may e.g. be applied to different sub-bands or groups of sub-bands individually by applying different damping signals for different sub-bands or groups of sub-bands.

More advantageous embodiments of the device, the method and the computer program according to the invention will be described in the detailed description of the invention following hereinafter.

BRIEF DESCRIPTION OF THE DRAWINGS

A more complete appreciation of the invention disclosed herein will be obtained as the same becomes better understood by reference to the following detailed description when considered in conjunction with the accompanying figures briefly described below.

DETAILED DESCRIPTION OF THE INVENTION

When describing the invention, reference will hereinafter be made to a hands-free conference telephone. However, it should be appreciated that a hands-free conference telephone is merely an example of a communication device for which the present invention is applicable. Other examples of communication devices that would benefit from the inventive principles are, e.g., integrated car telephones and conventional mobile telephones put in loudspeaker mode.

Figure 1:
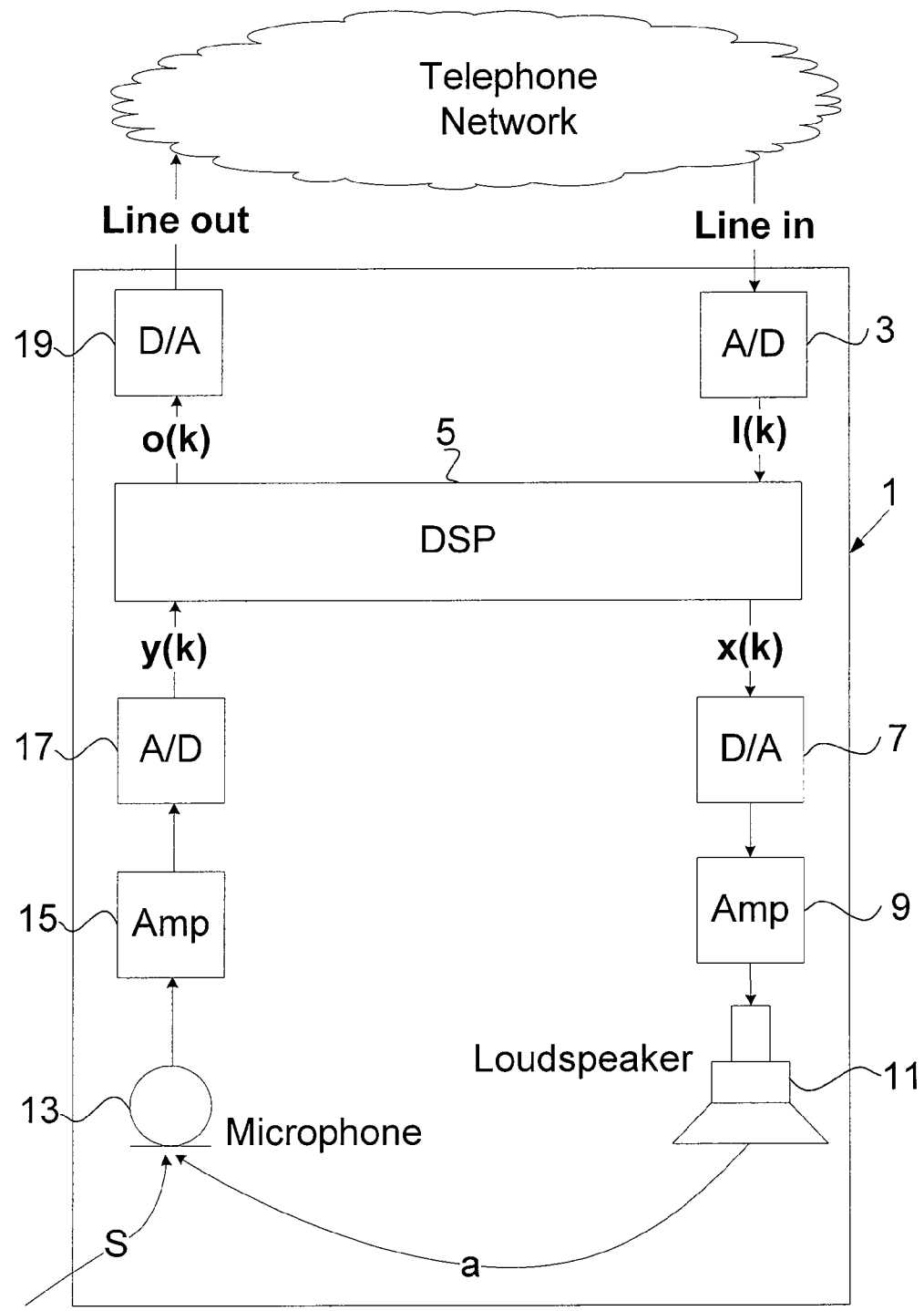
FIG. 1 is a schematic block diagram illustrating a conference telephone.

FIG. 1 illustrates a block diagram of a conference telephone 1. An analog line in signal carrying speech from the B-side, together with line-echo, is received from the telephone network at an input port of the conference telephone (not shown). The analog line in signal is converted to a discrete signal, l(k), by an analog-to-digital (A/D) converter 3. After this conversion, the signal l(k) is fed to a digital signal processor (DSP) 5 which processes the signal in attempt to reduce the line-echo while preserving the B-side speech, and generates an output signal in form of a loudspeaker signal, x(k). The loudspeaker signal x(k) is converted to an analog signal by a digital-to-analog (D/A) converter 7, amplified by an amplifier 9, and fed to a loudspeaker 11. The loudspeaker 11 thus presents the processed B-side speech to the A-side. Near-end speech, S, and acoustic echo, a, from the A-side is picked up by a microphone 13, amplified by an amplifier 15, and discretized by an A/D converter 17 to form a microphone signal, y(k), which is input to the DSP 5. The DSP 5 processes the microphone signal y(k) by attempting to reduce the acoustic echo a while preserving the A-side speech S resulting in an output signal, o(k). The output signal o(k) is then converted to an analog signal by a D/A converter 19, which analog signal is sent to the telephone network.

Figure 2:
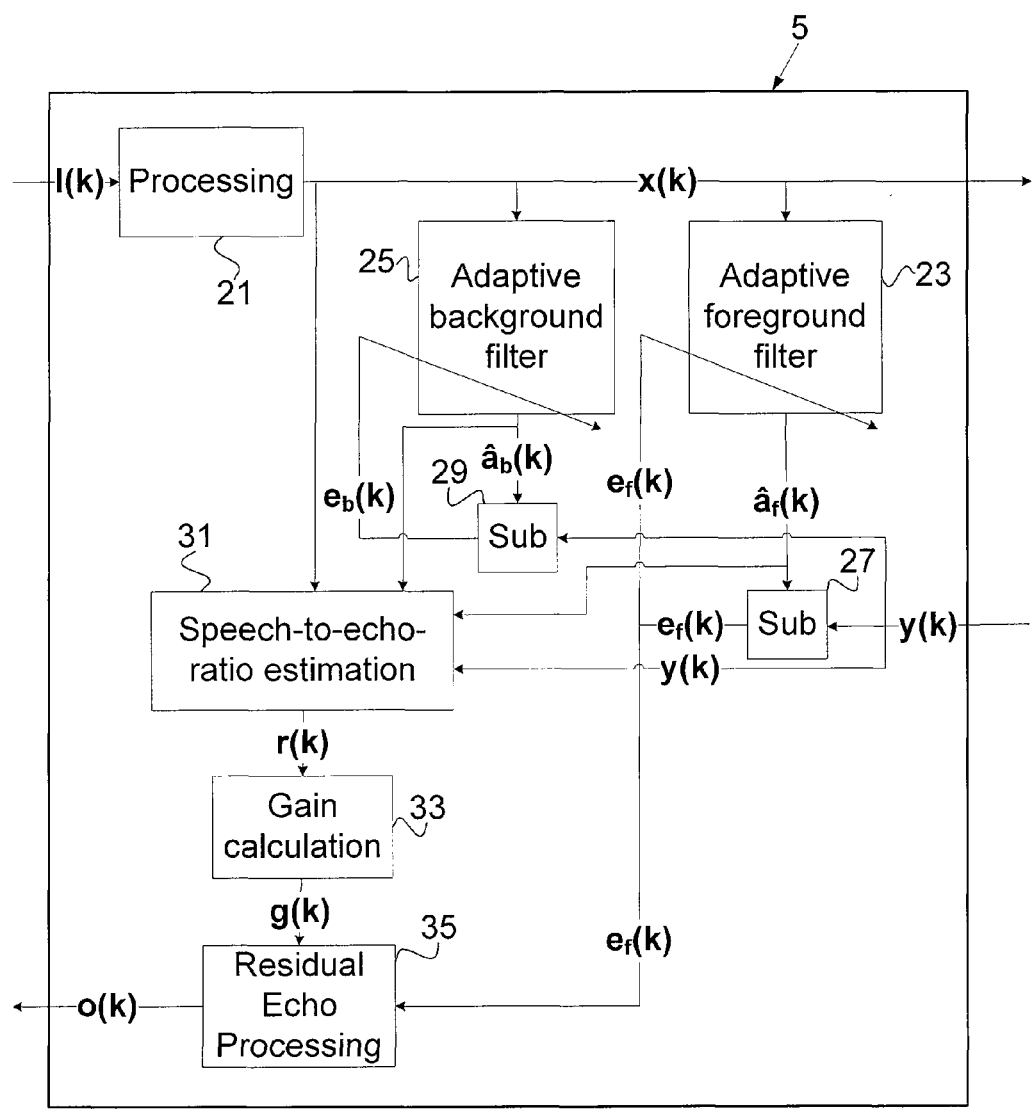
FIG. 2 is a block diagram illustrating an acoustic echo cancellation procedure performed by a Digital Signal Processor (DSP) of the conference telephone shown in FIG. 1.

FIG. 2 shows a block diagram illustrating the acoustic echo cancellation procedure performed by the DSP 5 in FIG. 1. The signal l(k) from the B-side is, after possible processing performed by a signal processor 21, forming the loudspeaker signal x(k) which is sent to the loudspeaker (11 in FIG. 1) and two adaptive echo cancelling filters 23, 25 of the DSP 5. The filter 23 is a foreground filter configured to output a first echo estimation signal, $\hat{a}_f(k)$, based on the received loudspeaker signal x(k). The filter 25 is a background filter configured to output a second echo estimation signal, $\hat{a}_b(k)$, based on the received loudspeaker signal x(k). The background filter 25 is more rapidly adapting than the foreground filter 23. The output, $\hat{a}_f(k)$, from the foreground filter 23 and the output, $\hat{a}_b(k)$, from the background filter are then subtracted from the microphone signal x(k) by a respective subtracter 27, 29 to form a foreground filter feedback signal, $e_f(k)$, and a background filter feedback signal, $e_b(k)$. The background filter feedback signal $e_b(k)$ is used to adapt the background filter 25 and the foreground filter feedback signal $e_f(k)$ may be used to adapt the foreground filter 23. However, the foreground filter 23 does not have to be implemented as a self-adjusting filter using the foreground filter feedback signal $e_f(k)$ to adapt itself. Instead, according to another embodiment of the invention, the foreground filter 23 is a "fix" filter in the sense of not being configured to self-adapt. The DSP 5 may comprise filter updating means (not shown) which is configured to update the foreground filter 23 by copying the background filter 25 into the foreground filter 23 when a certain criteria is met. Typically, the criteria is chosen such that the background filter 25 is copied into the foreground filter 23 when the background filter 25 is considered to perform better in terms of echo cancellation than the foreground filter 23.

The DSP 5 further comprises a speech-to-echo-ratio estimator 31 which is configured to calculate a near-end side speech-to-echo-ratio estimate, r(k). To do so, the speech-to-echo-ratio estimator 31 uses the loudspeaker signal x(k), the microphone signal y(k), the first echo estimation signal $\hat{a}_f(k)$ output by the foreground filter 23, and the second echo estimation signal $\hat{a}_b(k)$ output by the background filter 25. The speech-to-echo-ratio estimation signal r(k) calculated by the speech-to-echo-ratio estimator 31 is then fed to a gain calculator 33 which is configured to produce an output gain signal, g(k), based on the speech-to-echo-ratio estimation signal r(k). The gain signal g(k) is in turn fed to a residual echo processing unit 35 which is also fed with the echo-cancelled microphone signal $e_f(k)$ corresponding to the foreground filter feedback signal. The residual echo processing unit 35 is configured to determine the damping of the foreground filter feedback signal $e_f(k)$ based on the received gain signal. The gain calculator 33 can be configured to calculate a gain according to any known principle for determining a gain for an echo-cancelled microphone signal. For example, a basic gain calculator 33 may be configured to calculate the gain as follows:

$$g(k)=\lambda*g(k)+(1-\lambda)*g_c(k) \qquad (1)$$

where
$g_c(k)=1$ if $r(k)>T$, and
$g_c(k)=0$ if $r(k)\leq T$,
where T is a set threshold value, and $\lambda=\lambda_1$ if $g_c(k)>g(k)$ and $\lambda=\lambda_2$ if $g_c(k)\leq g(k)$, where $\lambda_1$ and $\lambda_2$ are smoothing factors determining the rise and fall times of the gain smoothing. The gain, $g(k)$, is then applied to the foreground filter feedback signal $e_f(k)$ by the residual echo processing unit 35 so as to form the output signal $o(k)$.

In this exemplary embodiment, the echo-cancelled microphone signal to which damping is applied is thus the foreground filter feedback signal $e_f(k)$ obtained by subtracting the first echo estimation signal $â_f(k)$ output by the foreground filter 23 from the microphone signal $y(k)$. However, it should be appreciated that the invention is not limited to the use of any particular echo-cancelled microphone signal. For example, the invention is equally applicable if the analog signal that is sent to the telephone network (see FIG. 1) is based on the background filter feedback signal $e_b(k)$ instead of the foreground filter feedback signal $e_f(k)$, or an echo-cancelled microphone signal formed by subtracting a "combination" of the first and second echo estimation signal from the microphone signal. That is, the invention is not concerned with how echo cancellation is performed but with how to control the damping of whatever echo-cancelled signal that is used to form the signal output by the communication device 1.

Figure 3:
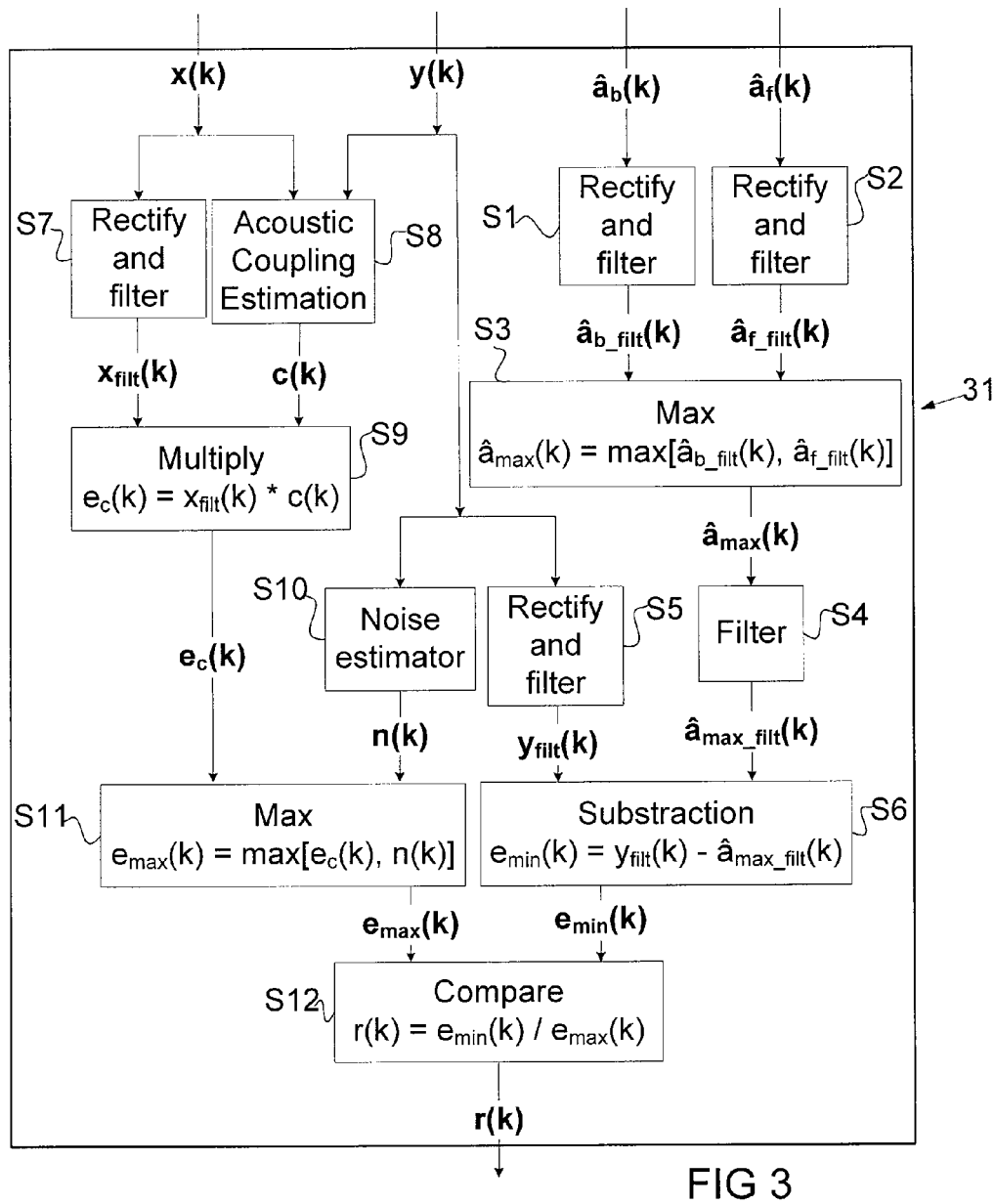
FIG. 3 is a block diagram illustrating a speech-to-echo estimation procedure performed by a speech-to-echo estimator of the DSP shown in FIG. 2.

FIG. 3 illustrates a more detailed block diagram of the processing performed by the speech-to-echo-ratio estimator 31 shown in FIG. 2.

In the steps S1 and S2, the first and second echo estimation signals, $â_f(k)$ and $â_b(k)$, are rectified and filtered to form a first rectified and filtered echo estimation signal $â_{f\_filt}(k)$ and a second rectified and filtered echo estimation signal $â_{b\_filt}(k)$, respectively. This may be achieved, e.g., by using moving average or exponential recursive weighting.

In step S3, the maximum of $â_{f\_filt}(k)$ and $â_{b\_filt}(k)$ is calculated, yielding a maximum echo estimation signal $â_{max}(k)$.

In step S4, the maximum echo estimation signal $â_{max}(k)$ is filtered using e.g. a moving average or exponential recursive weighting, resulting in a filtered maximum estimation signal $â_{max\_filt}(k)$.

In parallel to steps S1 to S4, the microphone signal $y(k)$ is rectified and filtered in a step S5, using e.g. a moving average or exponential recursive weighting, forming a rectified and filtered microphone signal $y_{filt}(k)$.

In step S6, the filtered maximum estimation signal $â_{max\_filt}(k)$ is subtracted from the rectified and filtered microphone signal $y_{filt}(k)$ to yield a minimum residual echo estimation signal $e_{min}(k)$. This signal, $e_{min}(k)$, can be seen as a smoothed average of the combined near-end speech and residual echo.

In parallel to steps S1 to S6, the loudspeaker signal $x(k)$ is rectified and filtered in a step S7, using e.g. a moving average or exponential recursive weighting, forming a rectified and filtered loudspeaker signal $x_{filt}(k)$. In a parallel step S8, an acoustic coupling factor $c(k)$ is estimated based on the loudspeaker signal $x(k)$ and the microphone signal $y(k)$. In a step S9, the rectified and filtered loudspeaker signal $x_{filt}(k)$ generated in step S7 is multiplied with the acoustic coupling factor $c(k)$ estimated in step S8 in order to produce a signal $e_c(k)$ which is a "worst case" estimate of the acoustic echo. In a step S10, a noise estimate $n(k)$ is estimated based on the loudspeaker signal $y(k)$. In a step S11, a maximum residual echo estimation signal $e_{max}(k)$ is calculated as the maximum of the signal $e_c(k)$ produced in step S9 and the noise estimate $n(k)$ estimated in step S10. Finally, in a step S12, a near-end speech-to-echo-ratio signal $r(k)$ is produced by dividing the minimum residual echo estimation signal $e_{min}(k)$ generated in step S6 with the maximum residual echo estimation signal $e_{max}(k)$ calculated in step S11. The near-end speech-to-echo-ratio signal $r(k)$ is then transmitted to the gain calculator 33 shown in FIG. 2 and subsequently used for controlling the damping of the echo-cancelled microphone signal $e_f(k)$.

Thus, according to the proposed method, the damping of the echo-cancelled microphone signal $e_f(k)$ is based on a speech-to-echo-ratio signal $r(k)$ which in turn is based on the maximum echo estimation signal $e_{max}(k)$.

The steps S1 to S12 may be performed in several different ways. As previously mentioned, the signals can be divided into different frequency bands and the processing can be performed in individual frequency bands, or the processed signals can be full-band signals or a set of sub-band signals, where a specific processed signal can be processed using one, several or all of the input signals.

Figure 4A:
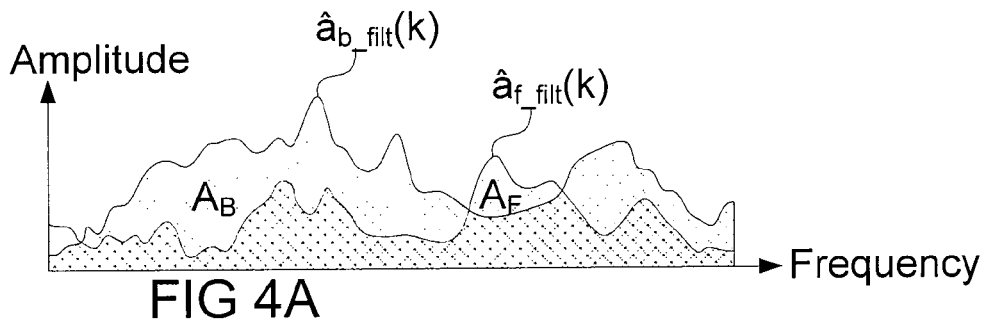
FIGS. 4A-B illustrate an exemplary way of calculating a maximum echo estimation signal according to an embodiment of the invention.
Figure 4B:
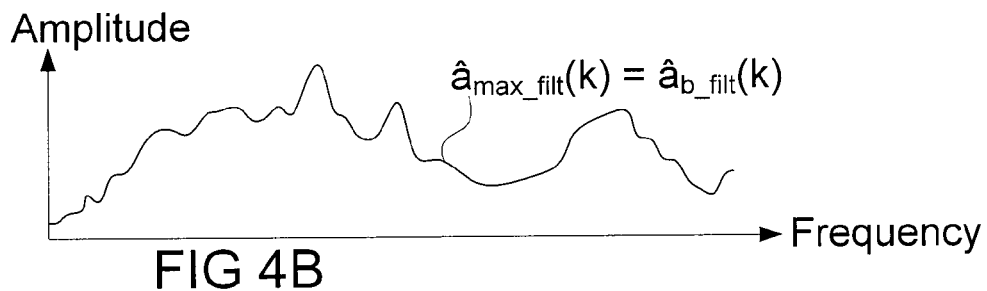

FIGS. 4A and 4B illustrate an exemplary way in which the maximum echo estimation signal $â_{max}(k)$ can be calculated based on the first and second echo estimation signals, $â_f(k)$ and $â_b(k)$. The graphs in FIG. 4A illustrate examples of a first and a second echo estimation signal after being rectified and filtered in steps S1 and S2 in FIG. 3. The graphs illustrate the power of the rectified echo estimation signals $â_{f\_filt}(k)$ and $â_{b\_filt}(k)$ as functions of frequency for the relevant frequency range, and hence illustrate the power spectral densities of the respective signal. The relevant frequency range is typically the frequency range in which speech may occur. In this embodiment, the speech-to-echo-ratio estimator 31 (see FIG. 2) is configured to calculate the integral of the respective rectified echo estimation signal $â_{f\_filt}(k)$ and $â_{b\_filt}(k)$ for the entire relevant frequency range, i.e. the area in the xy-plane bounded by the respective signal. The integral of the rectified first echo estimation signal $â_{f\_filt}(k)$ originating from the foreground filter 23 is denoted $A_F$ and the integral of the rectified second echo estimation signal $â_{b\_filt}(k)$ originating from the background filter 25 is denoted $A_B$. The integrals of the first and second rectified echo estimation signals indicate how much energy is carried by the respective signal. In this exemplary case, the integral $A_B$ of the rectified second echo estimation signal $â_{b\_filt}(k)$ is larger than the integral $A_F$ of the rectified first echo estimation signal $â_{f\_filt}(k)$ which indicates that the second echo estimation signal $â_b(k)$ output by the background filter 25 carries more energy than the first echo estimation signal $â_f(k)$ output by the foreground filter 23. The speech-to-echo-ratio estimator 31 is configured to compare the integrals $A_F$ and $A_B$, i.e. the energies of the first and second echo estimation signal $â_f(k)$ and $â_b(k)$, and to set the maximum echo estimation signal $â_{max}(k)$ equal to the rectified echo estimation signal $â_{f\_filt}(k)$ or $â_{b\_filt}(k)$ having the largest integral. FIG. 4B illustrates the maximum echo estimation signal $â_{max}(k)$ calculated from the rectified first and second echo estimation signals $â_{f\_filt}(k)$ or $â_{b\_filt}(k)$ illustrated in FIG. 4A based on the above described principles. In this case, the maximum echo estimation signal $â_{max}(k)$ thus corresponds to the rectified second echo estimation signal $â_{b\_filt}(k)$.

Figure 5A:
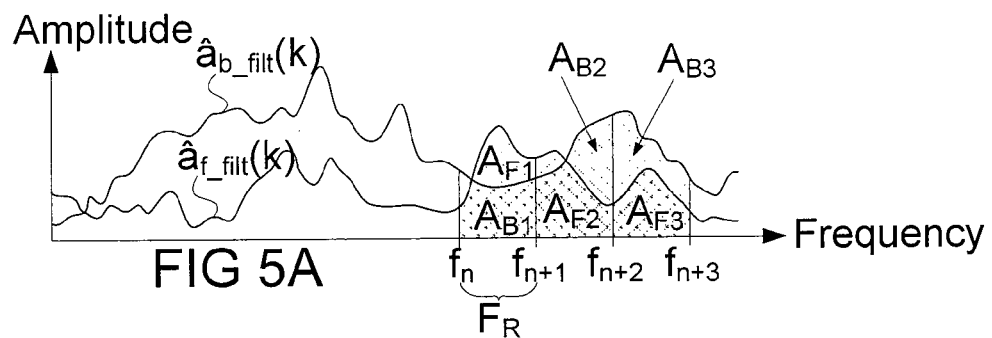
FIGS. 5A-B and 6A-B illustrate another exemplary way of calculating a maximum echo estimation signal according to an embodiment of the invention.
Figure 5B:
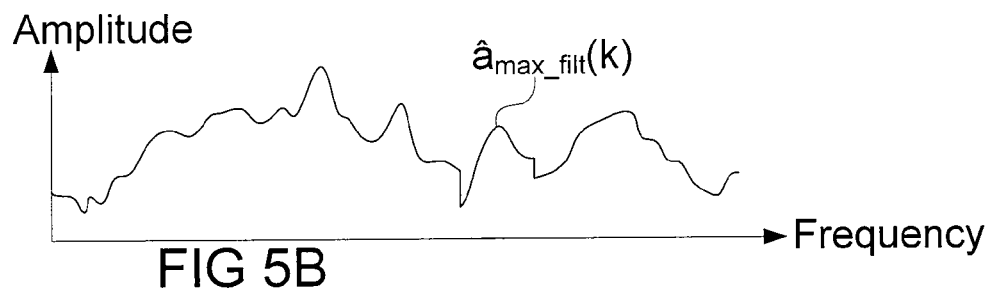

FIGS. 5A and 5B illustrates another exemplary way in which the maximum echo estimation signal $â_{max}(k)$ can be calculated based on the first and second echo estimation signals, $\hat{a}_f(k)$ and $\hat{a}_b(k)$. The graphs in FIG. 5A represent the rectified first and second echo estimation signals $\hat{a}_{f\_filt}(k)$ and $\hat{a}_{b\_filt}(k)$ and FIG. 5B illustrates the maximum echo estimation signal $\hat{a}_{max}(k)$ calculated from the rectified first and second echo estimation signals $\hat{a}_{f\_filt}(k)$ or $\hat{a}_{b\_filt}(k)$ illustrated in FIG. 5A when calculated on a sub-band basis. In this embodiment the speech-to-echo-ratio estimator 31 is configured to calculate the integral for each of the first and second rectified echo estimation signals within a certain frequency range or sub-band, which frequency range or sub-band is denoted $F_R$ in FIG. 5A. The maximum echo estimation signal $\hat{a}_{max}(k)$ is then calculated on a sub-band basis by, for each sub-band, calculate the maximum echo estimation signal $\hat{a}_{max}(k)$ such that it corresponds to the rectified echo estimation signal $\hat{a}_{f\_filt}(k)$ or $\hat{a}_{b\_filt}(k)$ having the largest integral within that sub-band. For example, in the sub-band between the frequencies $f_n$ and $f_{n+1}$, in which the integral $A_{F1}$ of the rectified first echo estimation signal $\hat{a}_{f\_filt}(k)$ is larger than the integral $A_{B1}$ of the rectified second echo estimation signal $\hat{a}_{b\_filt}(k)$, the maximum echo estimation signal $\hat{a}_{max}(k)$ is set to correspond to the rectified first echo estimation signal $\hat{a}_{f\_filt}(k)$. In all other sub-bands, given this exemplary band width, the integral of the second echo estimation signal $\hat{a}_{b\_filt}(k)$ is larger than the integral of the rectified first echo estimation signal $\hat{a}_{f\_filt}(k)$ and, therefore, the maximum echo estimation signal $\hat{a}_{max}(k)$ will, for these frequency ranges, corresponds to the second echo estimation signal $\hat{a}_{b\_filt}(k)$. It should be noted that the only difference between this way of calculating the maximum echo estimation signal $\hat{a}_{max}(k)$ and the way of calculating the maximum echo estimation signal $\hat{a}_{max}(k)$ described with reference to FIGS. 4A and 4B is that the frequency range $F_R$ in the latter case can be said to correspond to the entire relevant frequency range. Thus, FIGS. 4A and 4B hence illustrate an embodiment of the invention according to which damping is controlled on a full-band basis whereas FIGS. 5A and 5B illustrate an embodiment according to which the damping is controlled on a sub-band basis.

Figure 6A:
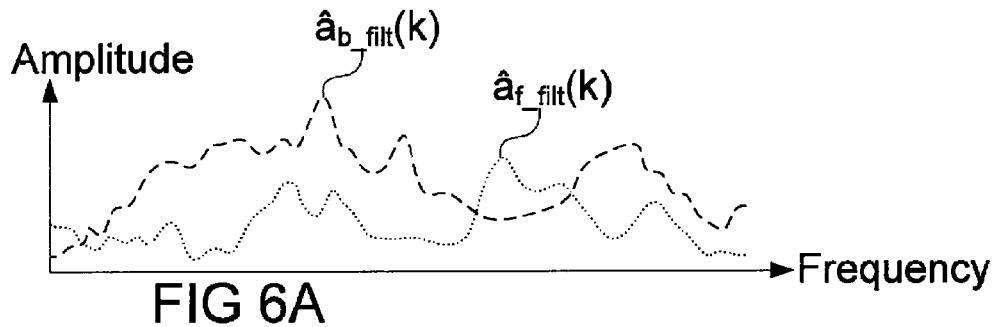
Figure 6B:
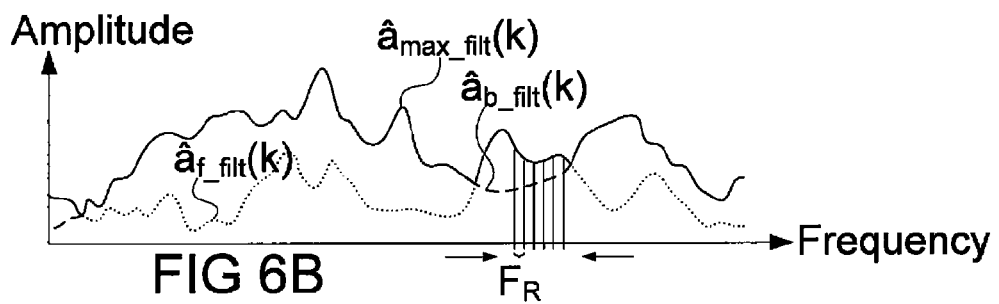

FIGS. 6A and 6B illustrate what will happen if the band width, i.e. the width of the sub-bands for which the maximum echo estimation signal $\hat{a}_{max}(k)$ is calculated as described above, approaches zero. If the speech-to-echo-ratio estimator 31 is configured to calculate the integrals for very narrow sub-bands, the power of the maximum echo estimation signal $\hat{a}_{max}(k)$ will, for substantially each given frequency, correspond to the power of the rectified echo estimation signal $\hat{a}_{f\_filt}(k)$ or $\hat{a}_{b\_filt}(k)$ having the highest power at that frequency. In this case, the maximum echo estimation signal $\hat{a}_{max}(k)$ will be truly indicative of the maximum energy content of the first and second echo estimation signals, $\hat{a}_f(k)$ and $\hat{a}_b(k)$.

It should be understood that the above described ways of forming the maximum echo estimation signal $\hat{a}_{max}(k)$ by maximizing the rectified echo estimation signals $\hat{a}_{f\_filt}(k)$ and $\hat{a}_{b\_filt}(k)$ are only exemplary. The skilled person will appreciate that there are other ways in which the speech-to-echo-ratio estimator 31 can be configured to achieve a similar result. For example, the maximum echo estimation signal $\hat{a}_{max}(k)$ may be calculated by comparing the power of the first and second rectified echo estimation signals $\hat{a}_{f\_filt}(k)$ and $\hat{a}_{b\_filt}(k)$ at a plurality of discrete frequencies, set the power of the maximum echo estimation signal $\hat{a}_{max}(k)$ at a given frequency to the power of the rectified echo estimation signal $\hat{a}_{f\_filt}(k)$ or $\hat{a}_{b\_filt}(k)$ having the highest power at that frequency, and interpolate between the so determined power/frequency values of the maximum echo estimation signal $\hat{a}_{max}(k)$.

The skilled person will also appreciate that the reasoning given above is likewise applicable for the processing of steps S1, S2 and S4 to S12.

The steps of calculating the maximum echo estimation signal $\hat{a}_{max}(k)$ and for controlling the damping of the echo-cancelled microphone signal $e_f(k)$ based on the maximum echo estimation signal is preferably performed by means of a computer program.

Figure 7:
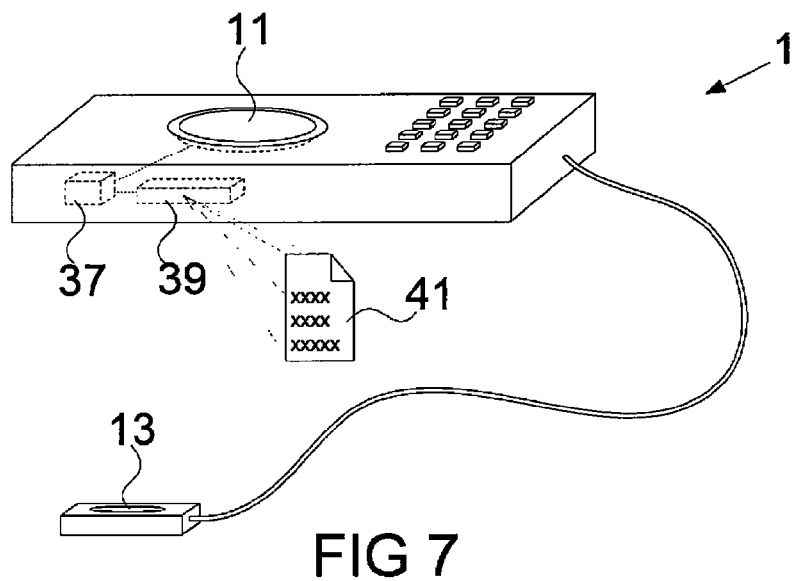
FIG. 7 illustrates a conference telephone comprising a computer program according to the invention.

FIG. 7 illustrates a conference telephone 1 comprising a loudspeaker 11 and a microphone 13. The conference telephone further comprises a processing unit 37 which may or may not be the DSP 5 in FIG. 1, and a computer readable medium 39 for storing digital information, such as a hard disk or another non-volatile memory. The computer readable medium 39 is seen to store a computer program 41 comprising computer readable code which, when executed by the processing unit 37, causes the DSP 5 to control the damping of the echo-cancelled microphone signal $e_f(k)$ according to principles described herein.

It should be appreciated that the functionality described above for controlling damping of acoustic residual echo could be incorporated in a separate damping device residing in the telephone network instead of in the conference telephone itself. In this case, the acoustic echo cancellation procedure illustrated in FIG. 2 is carried out by the network damping device, which device is configured to forward the loudspeaker signal $x(k)$ to the communication device for which it is intended, and receive the microphone signal $y(k)$ therefrom.

Also, as mentioned in the introductory portion, it should be appreciated that the invention could be used for controlling damping of residual line echoes, i.e. echoes generated in the telephone network. The description of such an embodiment is analogous with the description above describing an acoustic echo scenario. The line echo scenario can most easily be appreciated by in FIGS. 2 and 3 replacing the loudspeaker signal $x(k)$ with the line out signal $o(k)$, the microphone signal $y(k)$ with the line in signal $l(k)$, the line out signal $o(k)$ with the loudspeaker signal $x(k)$ and the line in signal $l(k)$ with the microphone signal $y(k)$.

The invention claimed is:

1. A device comprising:
   an adaptive foreground filter configured to calculate a first echo estimation signal based on a first input signal;
   an adaptive background filter being more rapidly adapting than said adaptive foreground filter and configured to calculate a second echo estimation signal based on said first input signal, and
   damping control means for controlling damping of an echo-cancelled output signal,
   wherein said damping control means is configured to calculate a maximum echo estimation signal using both said first and said second echo estimation signals, calculate a minimum residual echo estimation signal by subtracting said maximum echo estimation signal from a second input signal, calculate a maximum residual echo estimation signal based on said first input signal and a coupling factor, and to control the damping of the echo-cancelled output signal based on a comparison between said minimum residual echo estimation signal and said maximum residual echo estimation signal.

2. The device according to claim 1, wherein said damping control means is configured to calculate said maximum echo estimation signal based on the power or energy spectral densities of said first and second echo estimation signals.

3. The device according to claim 2, wherein said damping control means is configured to calculate said maximum echo estimation signal by, for a given frequency or frequency range, calculate an amplitude for the maximum echo estimation signal based on the power or energy of the echo estimation signal having the highest power or energy of said first second echo estimation signals at said frequency or within said frequency range.

4. The device according to claim 1, wherein said damping control means is configured to calculate said maximum residual echo estimation as a combination of:
   a residual echo estimation signal which in turn is calculated based on said first input signal and said coupling factor, and
   a noise estimation signal which in turn is calculated based on said second input signal.

5. The device according to claim 1, said device being configured to perform all or some of the calculations for given sub frequency bands of the processed signals, such that the residual damping may be performed in sub-bands or in full band based on some or all of the frequency bands used.

6. The device according to claim 1, further comprising filter updating means configured to update the foreground filter by copying the background filter into the foreground filter when a certain criteria is met.

7. The device according to claim 1, wherein said device is a communication device, such as a conference telephone or an integrated car telephone, and comprises a loudspeaker for converting the first input signal to sound when said first input signal is a loudspeaker signal, and a microphone for converting sound to a second input signal in form of a microphone signal.

8. A method for controlling damping of an echo-cancelled output signal comprising:
   calculating, by means of a foreground filter, a first echo estimation signal based on a first input signal;
   calculating, by means of an adaptive background filter being more rapidly adapting than said foreground filter, a second echo estimation signal based on said first input signal,
   calculating a maximum echo estimation signal using both said first and said second echo estimation signals, a minimum residual echo estimation signal by subtracting said maximum echo estimation signal from a second input signal a maximum residual echo estimation signal based on said first input signal and a coupling factor, and
   controlling the damping of said echo-cancelled output signal based on a comparison between said minimum residual echo estimation signal and said maximum residual echo estimation signal.

9. The method according to claim 8, wherein calculating the maximum echo estimation signal is performed by calculating the maximum echo estimation signal based on the power or energy spectral densities of said first and second echo estimation signals.

10. The method according to claim 9, wherein calculating the maximum echo estimation signal is performed by, for a given frequency or frequency range, calculating an amplitude for the maximum echo estimation signal based on the power or energy of the echo estimation signal having the highest power or energy of said first and second echo estimation signals at said frequency or within said frequency range.

11. The method according to claim 8, wherein the maximum residual echo estimation is calculated as a combination of:
   a residual echo estimation signal which in turn is calculated based on said first input signal and said coupling factor, and
   a noise estimation signal which in turn is calculated based on said second input signal.

12. The method according to claim 8, wherein all or some of the calculations are performed for given sub frequency bands of the processed signals, such that the residual damping may be performed in sub-bands or in full band based on some or all of the frequency bands used.

13. A computer program product comprising a non-transitory computer readable medium and computer readable code stored on the computer readable medium, the computer readable code operable to, when executed on a processing unit, perform a method comprising:
   calculating, by means of a foreground filter, a first echo estimation signal based on a first input signal;
   calculating, by means of an adaptive background filter being more rapidly adapting than said foreground filter, a second echo estimation signal based on said first input signal,
   calculating a maximum echo estimation signal using both said first and said second echo estimation signals, a minimum residual echo estimation signal by subtracting said maximum echo estimation signal from a second input signal, a maximum residual echo estimation signal based on said first input signal and a coupling factor, and
   controlling the damping of said echo-cancelled output signal based on a comparison between said minimum residual echo estimation signal and said maximum residual echo estimation signal.

14. The computer program product according to claim 13, wherein calculating the maximum echo estimation signal is performed by calculating the maximum echo estimation signal based on the power or energy spectral densities of said first and second echo estimation signals.

15. The computer program product according to claim 14, wherein calculating the maximum echo estimation signal is performed by, for a given frequency or frequency range, calculating an amplitude for the maximum echo estimation signal based on the power or energy of the echo estimation signal having the highest power or energy of said first and second echo estimation signals at said frequency or within said frequency range.

16. The computer program product according to claim 13, wherein the maximum residual echo estimation is calculated as a combination of:
   a residual echo estimation signal which in turn is calculated based on said first input signal and said coupling factor, and
   a noise estimation signal which in turn is calculated based on said second input signal.

17. The computer program product according to claim 13, wherein all or some of the calculations are performed for given sub frequency bands of the processed signals, such that the residual damping may be performed in sub-bands or in full band based on some or all of the frequency bands used.

* * * * *

UNITED STATES PATENT AND TRADEMARK OFFICE
CERTIFICATE OF CORRECTION

PATENT NO. : 8,693,678 B2  Page 1 of 1
APPLICATION NO. : 13/384554
DATED : April 8, 2014
INVENTOR(S) : Lindström et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 244 days.

Signed and Sealed this
Twenty-ninth Day of September, 2015

Michelle K. Lee
*Director of the United States Patent and Trademark Office*